US012776918B2

(12) United States Patent
Ejiri et al.

(10) Patent No.: US 12,776,918 B2
(45) Date of Patent: Oct. 27, 2026

(54) INFORMATION PROCESSING DEVICE AND INFORMATION PROCESSING METHOD

(71) Applicant: Kioxia Corporation, Tokyo (JP)

(72) Inventors: Taichi Ejiri, Yokohama Kanagawa (JP); Kentaro Umesawa, Kawasaki Kanagawa (JP)

(73) Assignee: KIOXIA CORPORATION, Tokyo (JP)

( * ) Notice: Subject to any disclaimer, the term of this patent is extended or adjusted under 35 U.S.C. 154(b) by 43 days.

(21) Appl. No.: 18/672,175

(22) Filed: May 23, 2024

(65) Prior Publication Data

US 2024/0422009 A1 Dec. 19, 2024

(30) Foreign Application Priority Data

Jun. 19, 2023 (JP) ................................ 2023-100353

(51) Int. Cl.
*H04L 9/32* (2006.01)
*H04L 9/08* (2006.01)

(52) U.S. Cl.
CPC .......... *H04L 9/3247* (2013.01); *H04L 9/0869* (2013.01); *H04L 9/3242* (2013.01)

(58) Field of Classification Search
CPC .... H04L 9/3247; H04L 9/0869; H04L 9/3242
See application file for complete search history.

(56) References Cited

U.S. PATENT DOCUMENTS 9,165,143 B1 10/2015 Sanders et al.
9,430,658 B2 8/2016 Covey et al.
2015/0286823 A1 10/2015 Elnekaveh et al.
2022/0335132 A1* 10/2022 Thor .................... H04L 9/3247
2023/0177173 A1* 6/2023 Wu ....................... G06F 21/602
2023/0283475 A1* 9/2023 Jiang .................. H04W 12/122
713/155

* cited by examiner

*Primary Examiner* — Cheng-Feng Huang
(74) *Attorney, Agent, or Firm* — Foley & Lardner LLP

(57) ABSTRACT

An information processing device includes a first determination unit that determines whether instruction information for issuing an instruction to switch from a first verification method of verifying validity of firmware by using a digital signature generated based on public key encryption to a second verification method of verifying the validity of the firmware by using a message authentication code generated using a message authentication key generated based on a random number has been received, a random number generator that generates the random number, a first generation unit that generates the message authentication key used to generate the message authentication code, based on the random number, when it is determined by the first determination unit that the instruction information has been received, and a second generation unit that generates the message authentication code of the firmware using the message authentication key.

17 Claims, 4 Drawing Sheets

1: INFORMATION PROCESSING SYSTEM

1: INFORMATION PROCESSING SYSTEM

INFORMATION PROCESSING DEVICE AND INFORMATION PROCESSING METHOD

CROSS-REFERENCE TO RELATED APPLICATION

This application is based upon and claims the benefit of priority from Japanese Patent Application No. 2023-100353, filed Jun. 19, 2023, the entire contents of which are incorporated herein by reference.

FIELD

Embodiments described herein relate generally to an information processing device and an information processing method.

BACKGROUND

In recent years, technology has been increasingly software-based, and the number of information processing devices that perform various types of information processing by using software called firmware that controls hardware such as a central processing unit (CPU) is increasing.

The firmware is easily updated, and the defect can be corrected and the function can be expanded by the update. Meanwhile, the firmware is easier to tamper with than the hardware, and malicious tampering may be performed during the update of the firmware. Therefore, when updating the firmware, it is common to provide the updated firmware with a digital signature added thereto.

A digital signature is generated by using public key encryption and has higher secrecy than a message authentication code generated by using a message authentication key. Meanwhile, it is known that a quantum computer can efficiently solve a discrete logarithm problem and a prime factorization problem required for decryption, and the digital signature may be tampered with when the quantum computer is used widely.

DETAILED DESCRIPTION

Embodiments provide an information processing device and an information processing method that can detect tampering with firmware.

In general, according to at least one embodiment, there is provided an information processing device including a first determination unit (first determination circuit) that determines whether instruction information for issuing an instruction to switch from a first verification method of verifying validity of firmware by using a digital signature generated based on public key encryption to a second verification method of verifying the validity of the firmware by using a message authentication code generated using a message authentication key generated based on a random number has been received, a random number generator that generates the random number, a first generation unit (first generation circuit) that generates the message authentication key used to generate the message authentication code, based on the random number, when it is determined by the first determination unit that the instruction information has been received, and a second generation unit (second generation circuit) that generates the message authentication code of the firmware using the message authentication key.

Hereinafter, the present embodiment will be described with reference to the drawings.

Figure 1:
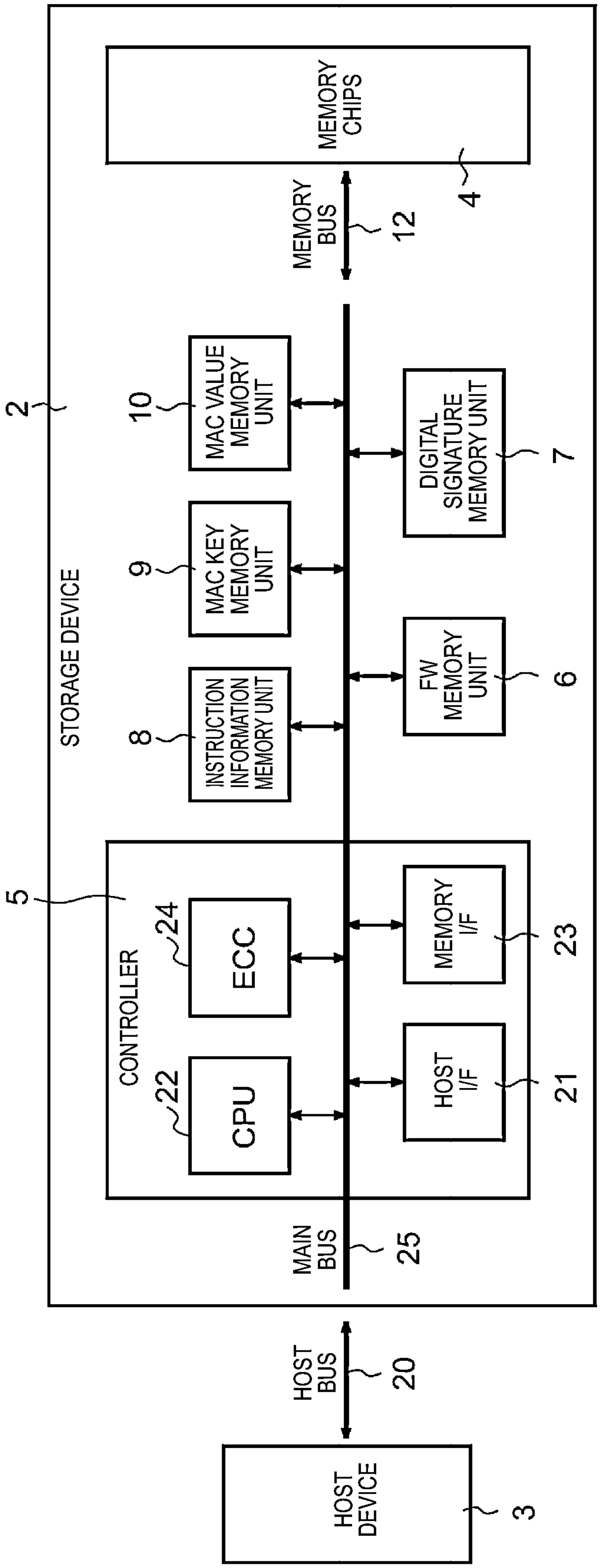
FIG. 1 is a block diagram of an information processing system according to the present embodiment.

FIG. 1 is a block diagram of an information processing system 1 according to the present embodiment. The information processing system 1 includes a storage device 2 and a host device 3. The storage device 2 and the host device 3 are connected to each other via a host bus 20.

The storage device 2 is a device that stores data. The storage device 2 is, for example, a solid-state drive (SSD), a universal serial bus (USB) memory, a universal flash storage (UFS) device, a multi media card (MMC), or an SD card.

The host device 3 is an information processing device outside the storage device 2.

The storage device 2 includes memory chips 4, a controller 5, a firmware memory unit (hereinafter, referred to as an FW memory unit) 6, a digital signature memory unit 7, an instruction information memory unit 8, a message authentication code key (MAC key) memory unit 9, and a message authentication code (MAC value) memory unit 10.

The memory chips 4 are devices that store data in a non-volatile manner. The memory chips 4 are, for example, chips including a NAND flash memory.

The controller 5 is an information processing device in the storage device 2. The controller 5 is connected to the memory chips 4 via the memory bus 12. The controller 5 has a host interface circuit (host I/F) 21, a processor (CPU) 22, a memory interface circuit (memory I/F) 23, and an error checking and correcting (ECC) circuit 24. The host I/F 21, the CPU 22, the memory I/F 23, and the ECC circuit 24 are connected to a main bus 25.

The host I/F 21 is an interface circuit that transmits and receives data to and from the outside of the storage device 2.

The CPU 22 is an arithmetic processing device. The CPU 22 executes firmware.

The memory I/F 23 is an interface circuit that transmits and receives data.

The ECC circuit 24 is a circuit that detects and corrects an error in the data read out from the memory chips 4.

The FW memory unit 6 is a non-volatile memory. The FW memory unit 6 stores firmware.

The digital signature memory unit 7 is a non-volatile memory. The digital signature memory unit 7 stores the digital signature and the public key received together with the firmware. The digital signature memory unit 7 stores the digital signature and the public key in association with the firmware. The FW memory unit 6 and the digital signature memory unit 7 may be integrated into one non-volatile memory.

The instruction information memory unit 8 is a non-volatile memory or an electronic fuse. The instruction information memory unit 8 stores the instruction information. The instruction information will be described below. The electronic fuse is a storage device that stores information in a non-volatile manner. The electronic fuse is provided for each bit of a digital signal configured with a plurality of bits.

0 or 1 is stored depending on whether the element of the electronic fuse is cut by the electric signal.

The MAC key memory unit 9 is a non-volatile memory or an electronic fuse. The MAC key memory unit 9 stores a message authentication key (hereinafter, referred to as a MAC key). The MAC key is used to generate a message authentication code (hereinafter, referred to as a MAC value). The MAC key is a key unique to the storage device 2. The instruction information memory unit 8 and the MAC key memory unit 9 may be integrated into one non-volatile memory.

The MAC value memory unit 10 is a non-volatile memory. The MAC value memory unit 10 stores the MAC value in association with the firmware. The MAC value memory unit 10 and the FW memory unit 6 may be integrated into one memory unit.

Figure 2:
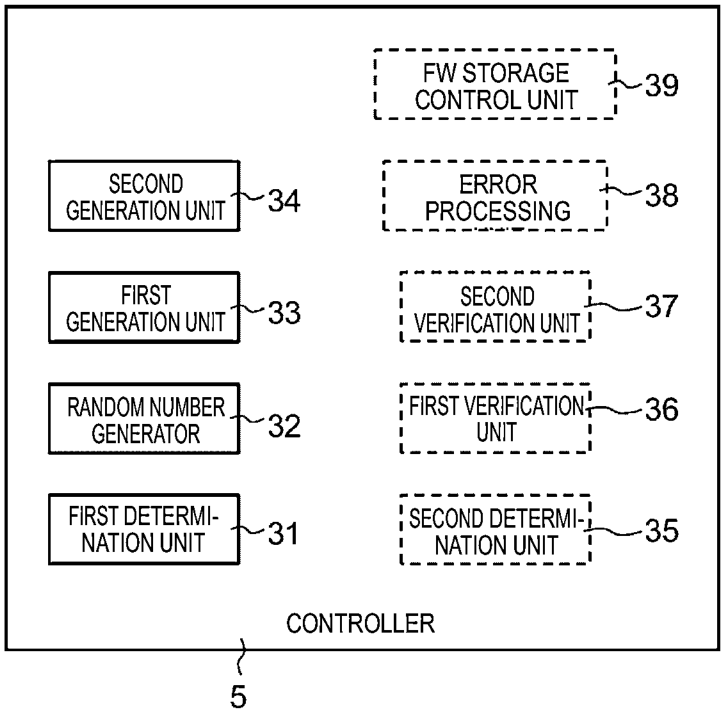
FIG. 2 is a functional block diagram of a controller according to the present embodiment.

FIG. 2 is a functional block diagram of a controller 5 according to the present embodiment. The controller 5 according to the present embodiment includes a first determination unit 31, a random number generator 32, a first generation unit 33, and a second generation unit 34. In addition, the controller 5 according to the present embodiment includes a second determination unit 35, a first verification unit 36, a second verification unit 37, an error processing unit 38, and a firmware storage control unit (hereinafter, referred to as an FW storage control unit) 39. The elements of the controller may be implemented as hardware and/or software, and thus may be implemented as circuits.

The first determination unit 31 determines whether the storage device 2 receives the instruction information. The instruction information is information transmitted when issuing an instruction to the storage device 2 to switch from the first verification method to the second verification method. The instruction information is transmitted at the time of the update of the firmware or at the time irrelevant to the update of the firmware. The first verification method is a method of verifying the validity of the firmware by verifying a digital signature generated by using public key encryption (secret key) using a public key. The second verification method is a method of verifying the validity of the firmware by using a MAC key generated using a MAC value.

The random number generator 32 generates a random number. The random number generator 32 generates a random number using, for example, a hash function. The random number generated by the random number generator 32 is, for example, a pseudo random number.

The first generation unit 33 generates the MAC key by using the random number generated by the random number generator 32. The MAC key is a key unique to the controller 5. The MAC key is used to generate a MAC value.

The second generation unit 34 generates the MAC value by using the MAC key generated by the first generation unit 33. The MAC value is identification information.

The second determination unit 35 determines whether the instruction information stored the instruction is in information memory unit 8.

The first verification unit 36 verifies the firmware stored in the FW memory unit 6 by using the MAC value stored in the MAC value memory unit 10.

The second verification unit 37 verifies the firmware stored in the FW memory unit 6 by using the digital signature and the public key stored in the digital signature memory unit 7.

The error processing unit 38 performs predetermined error processing. The predetermined error processing is, for example, processing of generating log information indicating that a security risk is further increased. Alternatively, the predetermined error processing is processing of stopping predetermined information processing executed by the controller 5.

The FW storage control unit 39 stores the received firmware in the FW memory unit 6, and stores the digital signature and the public key received together with the firmware in the digital signature memory unit 7.

Figure 3:
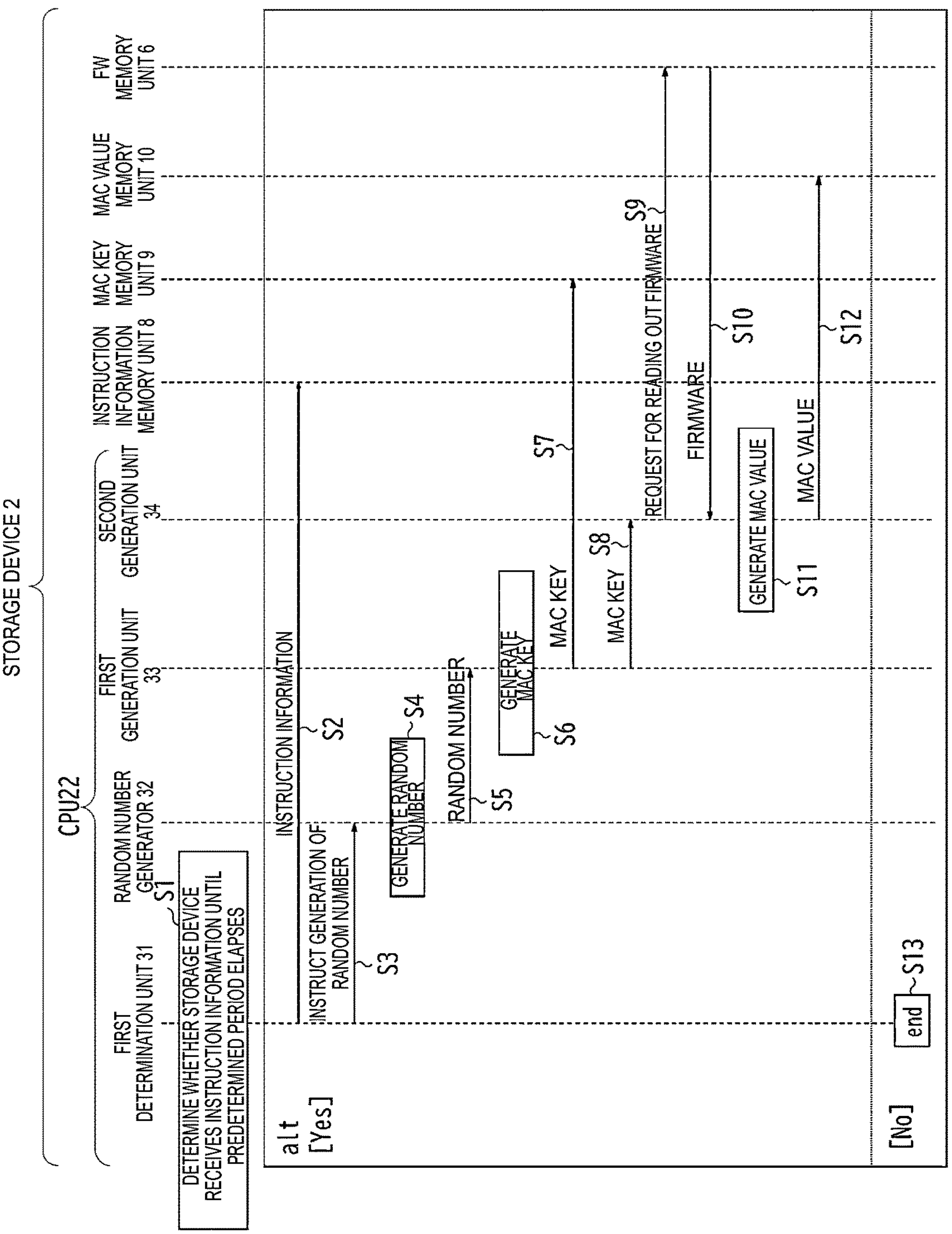
FIG. 3 is a sequence diagram showing a processing operation executed by the controller according to the present embodiment during update of the firmware.

FIG. 3 is a sequence diagram showing a processing operation executed by the controller 5 according to the present embodiment during update of the firmware.

When updating the firmware, the first determination unit 31 determines whether the storage device 2 receives the instruction information until a predetermined period elapses (S1).

When the storage device 2 receives the instruction information until a predetermined period elapses (S1 [Yes]), the first determination unit 31 stores the instruction information received by the storage device 2 in the instruction information memory unit 8 (S2).

When the instruction information is stored in the instruction information memory unit 8, the first determination unit 31 transmits an instruction to the random number generator 32 to generate a random number (S3).

When the random number generator 32 receives the instruction to generate the random number, the random number generator 32 generates the random number (S4).

The random number generator 32 transmits the generated random number to the first generation unit 33 (S5).

When the random number is received, the first generation unit 33 generates the MAC key by using the received random number (S6).

The first generation unit 33 stores the generated MAC key in the MAC key memory unit 9 (S7).

The first generation unit 33 sends the generated MAC key to the second generation unit 34 (S8).

When the MAC key is received, the second generation unit 34 transmits a request for reading out the firmware to the FW memory unit 6 (S9). The firmware requested to be read out is the latest firmware most recently stored in the FW memory unit 6.

When the request for reading out the firmware is received, the FW memory unit 6 outputs the firmware (S10).

When the firmware is received, the second generation unit 34 generates the MAC value by using the received MAC key and the received firmware (S11).

The second generation unit 34 stores the generated MAC value in the MAC value memory unit 10 (S12).

When the storage device 2 does not receive the instruction information until the predetermined period elapses (S1 [No]), the first determination unit 31 ends the sequence of FIG. 3 (S13).

Figure 4:
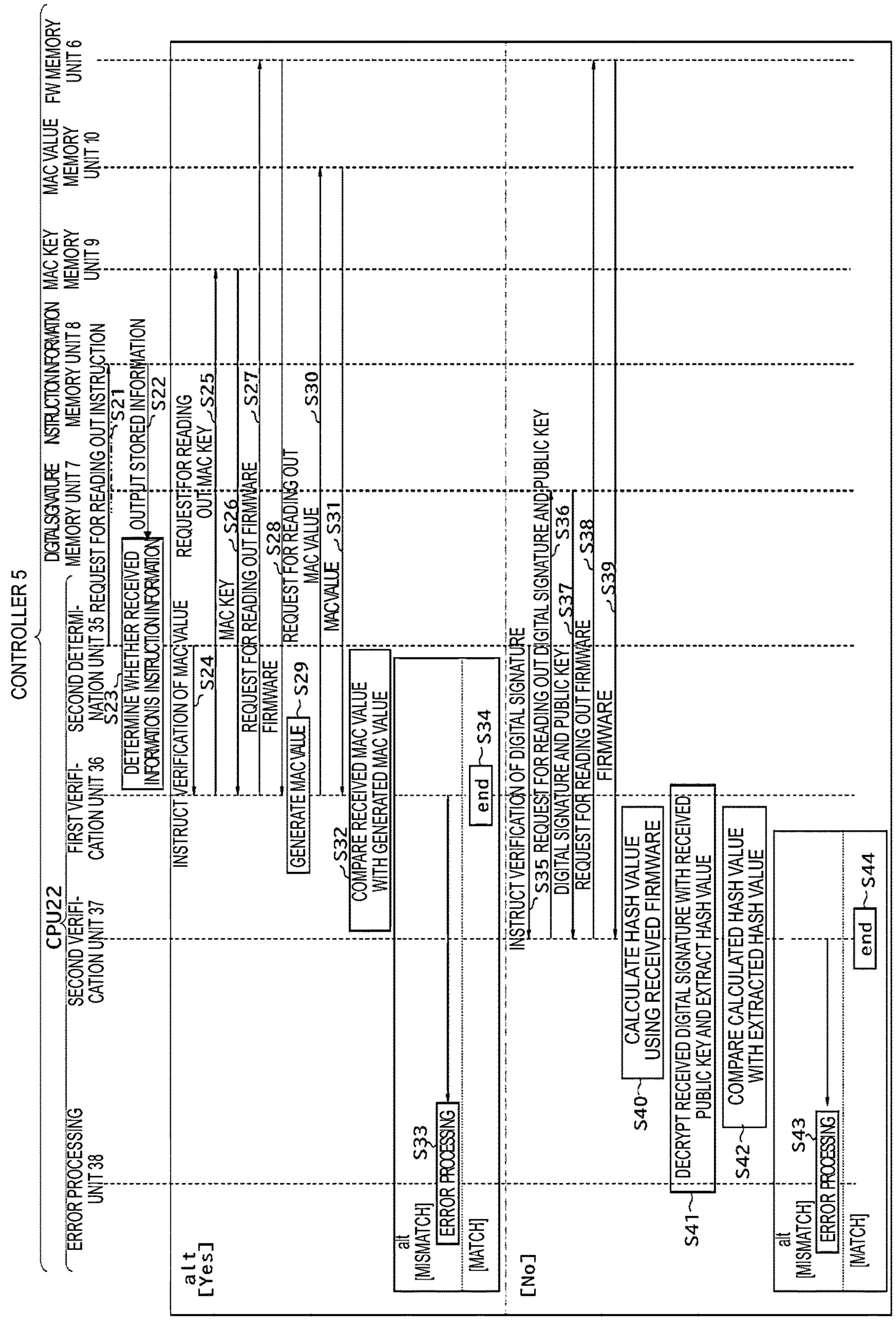
FIG. 4 is a sequence diagram showing a processing operation executed immediately after power is supplied to the controller after the processing of FIG. 3 is executed.

FIG. 4 is a sequence diagram showing a processing operation executed immediately after power is supplied to the controller 5 after the processing of FIG. 3 is executed.

Immediately after the power is supplied to the controller 5, the second determination unit 35 transmits a request for reading out the instruction information to the instruction information memory unit 8 (S21).

When the request for reading out the instruction information is received, the instruction information memory unit 8 outputs the stored information (S22).

When the information is received, the second determination unit 35 determines whether the received information is the instruction information (S23).

When the received information is the instruction information (S23 [Yes]), the second determination unit 35 transmits an instruction to the first verification unit 36 to verify the MAC value (S24).

When the first verification unit 36 receives the instruction to verify the MAC value, the first verification unit 36 transmits the request for reading out the MAC key to the MAC key memory unit 9 (S25).

When the request for reading out the MAC key is received, the MAC key memory unit 9 outputs the MAC key to the first verification unit 36 (S26).

When the MAC key is received, the first verification unit 36 transmits a request for reading out the firmware to the FW memory unit 6 (S27). The firmware requested to be read out is the latest firmware most recently stored in the FW memory unit 6.

When the request for reading out the firmware is received, the FW memory unit 6 outputs the firmware to the first verification unit 36 (S28).

When the firmware is received, the first verification unit 36 generates the MAC value by using the received MAC key and the received firmware (S29).

When the first verification unit 36 generates the MAC value, the first verification unit 36 transmits a request for reading out the MAC value to the MAC value memory unit 10 (S30).

When the request for reading out the MAC value is received, the MAC value memory unit 10 outputs the MAC value to the first verification unit 36 (S31).

When the MAC value is received, the first verification unit 36 compares the received MAC value with the generated MAC value (S32).

When the received MAC value does not match the generated MAC value (S32 [MISMATCH]), the first verification unit 36 causes the error processing unit 38 to perform predetermined error processing (S33).

When the received MAC value matches the generated MAC value (S32 [MATCH]), the first verification unit 36 ends the sequence of FIG. 4 (S34).

When the received information is not the instruction (S23 [No]), the second determination unit 35 information transmits an instruction to the second verification unit 37 to verify the digital signature (S35).

When the second verification unit 37 receives the instruction verify the digital signature, the second verification unit 37 transmits the request for reading out the digital signature and the public key to the digital signature memory unit 7 (S36).

When the request for reading out the digital signature and the public key is received, the digital signature memory unit 7 outputs the digital signature and the public key to the second verification unit 37 (S37).

When the digital signature and the public key are received, the second verification unit 37 transmits a request for reading out the firmware to the FW memory unit 6 (S38).

When the request for reading out the firmware is received, the FW memory unit 6 outputs the firmware to the second verification unit 37 (S39).

When the firmware is received, the second verification unit 37 calculates the hash value by using the received firmware (S40).

The second verification unit 37 decrypts the received digital signature by using the received public key and extracts the hash value (S41).

The second verification unit 37 compares the calculated hash value with the extracted hash value (S42).

When the calculated hash value does not match the extracted hash value (S42 [MISMATCH]), the second verification unit 37 causes the error processing unit 38 to perform predetermined error processing (S43).

When the calculated hash value matches the extracted hash value (S42 [MATCH]), the second verification unit 37 ends the sequence of FIG. 4 (S44).

According to the present embodiment, it is possible to verify whether the firmware is tampered with without impairing the secrecy using methods other than digital signatures.

According to the present embodiment, since the MAC key generated using the random number is not disclosed and is difficult to specify even by using the quantum computer, the verification method using the MAC key can be switched. As a result, it is possible to detect tampering with the firmware.

APPENDIX

Item 1

An information processing device including a first determination unit that determines whether instruction information for issuing an instruction to switch from a first verification method of verifying validity of firmware by using a digital signature generated based on public key encryption to a second verification method of verifying the validity of the firmware by using a message authentication code generated using a message authentication key generated based on a random number has been received, a random number generator that generates the random number, a first generation unit that generates the message authentication key used to generate the message authentication code, based on the random number, when it is determined by the first determination unit that the instruction information has been received, and a second generation unit that generates the message authentication code of the firmware using the message authentication key.

Item 2

The information processing device according to Item 1, including a firmware storage control unit that stores the firmware in a firmware memory unit and stores the digital signature received together with the firmware in a digital signature memory unit, in which the first determination unit stores the instruction information in an instruction information memory unit when the first determination unit determines that the instruction information has been received, the first generation unit stores the generated message authentication key in a message authentication key memory unit, and the second generation unit stores the generated message authentication code in a message authentication code memory unit.

Item 3

The information processing device according to Item 2, in which the firmware storage control unit stores the digital signature in the digital signature memory unit in association with the firmware until the message authentication code is generated by the second generation unit, and the second generation unit stores the message authentication code in the message authentication code memory unit in association with the firmware after the message authentication code is generated by the second generation unit.

Item 4

The information processing device according to Item 2 or 3, including a second determination unit that determines whether the instruction information is stored in the instruction information memory unit immediately after power is supplied, a first verification unit that verifies the firmware stored in the firmware memory unit using the message authentication code stored in the message authentication code memory unit when it is determined by the second determination unit that the instruction information is stored in the instruction information memory unit, and a second verification unit that verifies the digital signature when it is determined by the second determination unit that the instruction information is not stored in the instruction information memory unit.

Item 5

The information processing device according to Item 4, in which the first verification unit generates the message authentication code using the message authentication key read out from the message authentication key memory unit and the firmware read out from the firmware memory unit and verifies whether the generated message authentication code matches the message authentication code read out from the message authentication code memory unit, when it is determined by the second determination unit that the instruction information is stored in the instruction information memory unit.

Item 6

The information processing device according to Item 4 or 5, in which the second verification unit verifies the digital signature stored in the digital signature memory unit when it is determined by the second determination unit that the instruction information is not stored in the instruction information memory unit immediately after power is supplied.

Item 7

The information processing device according to Item 6, in which the second verification unit calculates a hash value using the firmware received from the firmware memory unit, decrypts the digital signature received from the digital signature memory unit with a public key to extract a hash value, and verifies whether the calculated hash value matches the extracted hash value, when it is determined by the second determination unit that the instruction information is not stored in the instruction information memory unit immediately after power is supplied.

Item 8

The information processing device according to any one of Items 4 to 7, including an error processing unit that performs predetermined error processing when a mismatch is verified by at least one of the first verification unit or the second verification unit.

Item 9

The information processing device according to Item 8, in which the predetermined error processing includes generation of log information indicating that a security risk has been further increased.

Item 10

The information processing device according to Item 8, in which the predetermined error processing includes processing of stopping execution of predetermined information processing.

Item 11

The information processing device according to any one of Items 1 to 10, in which the instruction information is given by a command from a host device at a time of update of the firmware or at a time irrelevant to the update of the firmware.

Item 12

The information processing device according to any one of Items 2 to 10, in which each of the instruction information memory unit and the message authentication key memory unit is a non-volatile memory unit that stores the instruction information or the message authentication key in a non-volatile manner.

Item 13

The information processing device according to Item 12, in which at least one of the instruction information memory unit or the message authentication key memory unit is an electronic fuse that stores the instruction information or the message authentication key.

Item 14

An information processing method including determining whether instruction information for issuing an instruction to switch from a first verification method of verifying validity of firmware by using a digital signature generated based on public key encryption to a second verification method of verifying the validity of the firmware by using a message authentication code generated using a message authentication key generated based on a random number has been received, and generating the message authentication key used to generate the message authentication code, based on the random number, when it is determined that the instruction information has been received.

While certain embodiments have been described, these embodiments have been presented by way of example only, and are not intended to limit the scope of the disclosure. Indeed, the novel embodiments described herein may be embodied in a variety of other forms; furthermore, various omissions, substitutions and changes in the form of the embodiments described herein may be made without departing from the spirit of the disclosure. The accompanying claims and their equivalents are intended to cover such forms or modifications as would fall within the scope and spirit of the disclosure.

What is claimed is:

1. An information processing device comprising:

a first determination circuit configured to determine whether instruction information for issuing an instruction to switch from (i) a first verification method of verifying validity of firmware based on using a digital signature generated based on public key encryption to (ii) a second verification method of verifying the validity of the firmware based on using a message authentication code generated using a message authentication key generated based on a random number that has been received;

a random number generator configured to generate the random number;

a first generation circuit configured to generate the message authentication key used to generate the message authentication code, based on the random number, when it is determined by the first determination circuit that the instruction information has been received;

a second generation circuit configured to generate the message authentication code of the firmware using the message authentication key;

a second determination circuit configured to determine whether the instruction information is stored in the instruction information memory after power is supplied;

a first verification circuit configured to verify the firmware stored in a firmware memory using the message authentication code stored in a message authentication code memory when it is determined by the second determination circuit that the instruction information is stored in the instruction information memory; and a second verification circuit configured to verify the digital signature when it is determined by the second determination circuit that the instruction information is not stored in the instruction information memory.

2. The information processing device according to claim 1, further comprising:

a firmware storage controller configured to store the firmware in the firmware memory and store the digital signature received together with the firmware in a digital signature memory, wherein the first determination circuit is configured to store the instruction information in an instruction information memory when the first determination circuit determines that the instruction information has been received, the first generation circuit is configured to store the generated message authentication key in the message authentication key memory, and the second generation circuit is configured to store the generated message authentication code in a message authentication code memory.

3. The information processing device according to claim 2, wherein the firmware storage controller is configured to store the digital signature in the digital signature memory in association with the firmware until the message authentication code is generated by the second generation circuit, and the second generation circuit is configured to store the generated message authentication code in the message authentication code memory in association with the firmware.

4. The information processing device according to claim 2, wherein each of the instruction information memory circuit and the message authentication key memory is a non-volatile memory that stores the instruction information or the message authentication key in a non-volatile manner.

5. The information processing device according to claim 4, wherein at least one of the instruction information memory or the message authentication key memory includes an electronic fuse that stores the instruction information or the message authentication key.

6. The information processing device according to claim 1, wherein the first verification circuit generates the message authentication code using the message authentication key received from the message authentication key memory and the firmware received from the firmware memory and verifies whether the generated message authentication code matches the message authentication code received from the message authentication code memory, when it is determined by the second determination circuit that the instruction information is stored in the instruction information memory.

7. The information processing device according to claim 1, wherein the second verification circuit verifies the digital signature stored in the digital signature memory when it is determined by the second determination circuit that the instruction information is not stored in the instruction information memory after power is supplied.

8. The information processing device according to claim 7, wherein the second verification circuit (i) calculates a hash value using the firmware received from the firmware memory, (ii) decrypts the digital signature received from the digital signature memory with a public key to extract a hash value, and (iii) verifies whether the calculated hash value matches the extracted hash value, when it is determined by the second determination circuit that the instruction information is not stored in the instruction information memory after power is supplied.

9. The information processing device according to claim 1, further comprising:

an error processing circuit configured to perform predetermined error processing when a mismatch is verified by at least one of the first verification circuit or the second verification circuit.

10. The information processing device according to claim 9, wherein the predetermined error processing includes generation of log information indicating that a security risk has increased.

11. The information processing device according to claim 9, wherein the predetermined error processing includes stopping execution of predetermined information processing.

12. The information processing device according to claim 1, wherein the instruction information is given by a command from a host device at a time of update of the firmware or at a time independent of the update of the firmware.

13. An information processing method comprising:

determining whether instruction information for issuing an instruction to switch from (i) a first verification method of verifying validity of firmware based on using a digital signature generated based on public key encryption to (ii) a second verification method of verifying the validity of the firmware based on using a message authentication code generated using a message authentication key generated based on a random number has been received;

generating the message authentication key used to generate the message authentication code, based on the random number, when it is determined that the instruction information has been received;

determining whether the instruction information is stored in an instruction information memory after power is supplied;

verifying the firmware stored in a firmware memory using the message authentication code stored in the message authentication code memory when it is determined that the instruction information is stored in the instruction information memory; and verifying the digital signature when it is determined that the instruction information is not stored in the instruction information memory.

14. The method according to claim 13, further comprising:

storing the firmware in the firmware memory and storing the digital signature received together with the firmware in a digital signature memory, storing the instruction information in the instruction information memory when it is determined that the instruction information has been received, storing the generated message authentication key, and storing the generated message authentication code in a message authentication code memory.

15. The method according to claim 14, further comprising:

storing the digital signature in the digital signature memory in association with the firmware until the message authentication code is generated, and storing the generated message authentication code in the message authentication code memory in association with the firmware.

16. The method according to claim 13, further comprising:

generating the message authentication code using the message authentication key received from the message authentication key memory and the firmware received from the firmware memory and verifying whether the generated message authentication code matches the message authentication code received from the message authentication code memory, when it is determined that the instruction information is stored in the instruction information memory.

17. The method according to claim 13, further comprising:

verifying the digital signature stored in the digital signature memory when it is determined that the instruction information is not stored in the instruction information memory after power is supplied.

* * * * *